Oct. 19, 1948.  C. H. WOODCOCK  2,451,600
TUBE GAUGE
Filed Feb. 3, 1945
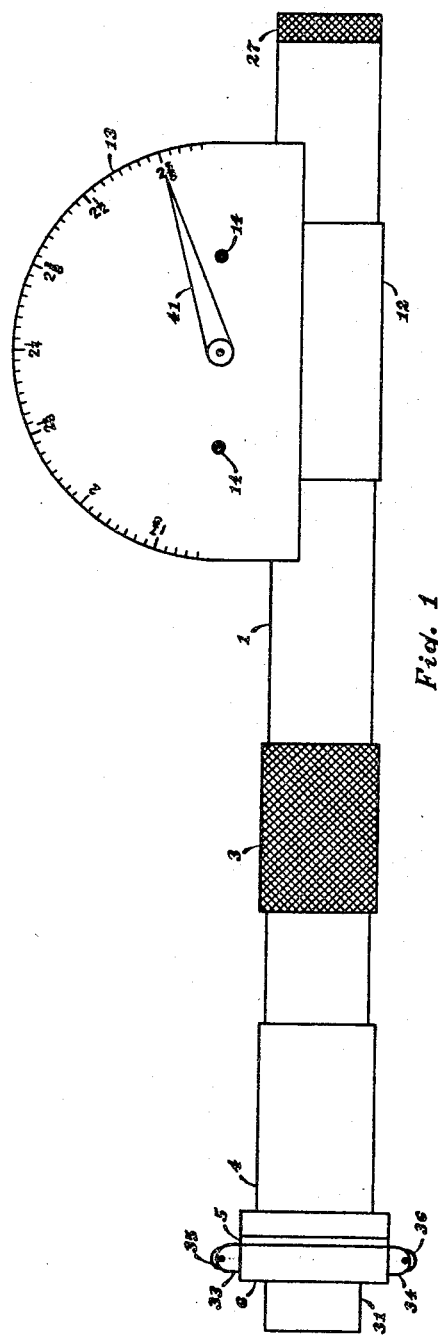
Fig. 1
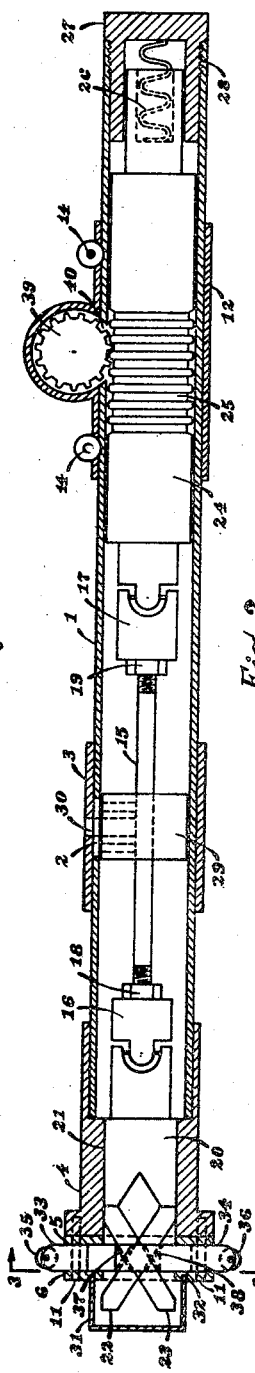
Fig. 2
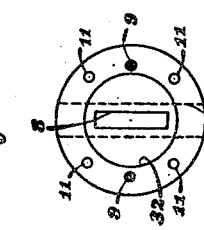
Fig. 5
Fig. 4
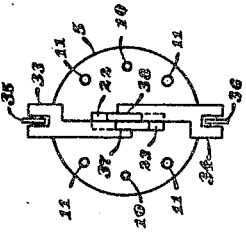
Fig. 3
Attest
Robert I. Staples
Andrew T. Zodl
Inventor
Charles H. Woodcock
By Norbert E. Buch
Attorney Patented Oct. 19, 1948

2,451,600

UNITED STATES PATENT OFFICE 2,451,600

TUBE GAUGE

Charles H. Woodcock, Philadelphia, Pa., assignor to The Atlantic Refining Company, Philadelphia, Pa., a corporation of Pennsylvania Application February 3, 1945, Serial No. 575,949

3 Claims. (Cl. 33—178)

The present invention relates to improvements in devices designed to measure the internal diameter of tubes, pipes, and the like. Such device may also be used for accurately determining the bore of any hole or opening.

In certain industries, such as petroleum refining and chemical production the processes employed frequently require the use of apparatus involving tubular heating elements. Where such elements are used, for example, in connection with oil heating and cracking the walls thereof are reduced from the inside by the action of heat and corrosive elements present in the fluids which pass through the tube. It is, therefore, vitally important that means be available whereby the internal dimension of the tube can be measured to detect such wearing away, not only to prevent disastrous blowouts but also to obtain maximum use of a member before replacement.

Furthermore, an accurate internal measurement is of great value where tubes must be joined to form a passageway through which fluids may pass, and wherein it is desirable that internal friction be kept at a minimum. Also, in those cases where any tube or plug having a circular cross section is to be frictionally fitted into or frictionally held by another piece of similar cross section, an accurate determination of the internal dimensions of both pieces will greatly faciiltate accomplishment of the desired result.

Because of its use in workshops, refineries and similar places in which rough treatment and hard usage will be accorded it, such a gage to be practical must be of rugged construction and be adapted to withstand such treatment without loss of accuracy. It should also be designed to obtain accurate results even though used by relatively unskilled labor.

A great problem in connection with the use of such gages, as have heretofore been known, is that of maintenance of accuracy when the parts have become worn. Such difficulty has arisen specifically in connection with the gage pins themselves which actually come in contact with the wall of the tube whose internal diameter is being measured. When the pins become worn and result in inaccuracy, it has been necessary to strip the entire device and insert new parts with the result that all moving parts of the gage must be realigned. In the present invention, this difficulty has been avoided by the use of a roller at the end of each gage pin, thereby permitting the replacement of said rollers without disturbing the other parts.

Therefore, one of the objects of the invention is to provide means for obtaining an accurate measurement of the internal dimensions of tubes or the like, such measurement being read externally of the tube by means of calibration indicating diametric measurement.

Another object of the invention is to provide means for obtaining an accurate measurement of the internal diameter of the tube, said means being of sufficiently rugged construction to withstand rough treatment and adapted to work efficiently even when operated by relatively unskilled labor.

A further object of the invention is to provide a device for obtaining an accurate measurement of the internal diameter of a tube, the integral parts of which are easily replaceable and without extensive readjustment of other parts.

Other objects of the invention will be apparent from the description and claims which follow.

Reference is now made to the drawings wherein like numerals are used to designate like parts.

Figure 1 is a side elevation of the device of the present invention.

Figure 2 is a side sectional view of Figure 1.

Figure 3 is an end view of the device taken along the lines 3—3 of Figure 2.

Figure 4 is an end view of the housing member designated as 6 in Figure 1.

Figure 5 is a side elevation of the housing member 6 shown in Figure 4.

The device shown in the drawing comprises a casing 1 having a longitudinal slot formed therein as at 2, and having a sleeve 3 slidably mounted thereon relative to the slot. A flange 4 is rigidly affixed at one end of casing 1 adjacent to which is disposed apertured plate 5. Outwardly of plate 5 is positioned a housing 6 provided with a transverse channel 7 and an aperture 8. Dowel pins 9 on housing 6 extend through corresponding holes 10 in apertured plate 5 and flange 4. Housing 6, apertured plate 5 and flange 4 are fastened together by bolts 11 or other suitable means. Spaced from the opposite end of casing 1 is collar 12 bearing calibrated plate 13 which is removably affixed thereto by bolts 14, or other suitable means.

Slidably disposed within casing 1 is an operating rod, comprising a spindle 15 threadably connected at each end with universal joints 16 and 17, respectively, and locked thereto by nuts 18 and 19 respectively. The universal joint 16 is in turn connected to a cylindrical shaft 20, slidably disposed within the longitudinal bore 21 of flange 4, upon the end of which shaft are rigidly affixed a pair of diagonally-crossed plungers 22 and 23, the function of which will be described hereinafter. The other universal joint 17 is connected to second cylindrical shaft or body member 24, slidably disposed in casing 1, such body member being provided at its midsection with a rack 25, and at its outer end with a recess to accommodate a tension means such as coil spring 26. Surrounding the outer recessed end of member 25 is a plug 27 threaded to casing 1 at 28 and adapted to retain the spring 27 as well as the entire operating rod assembly within casing 1. Immovably affixed to the midsection of spindle 15 is a cylindrical member 29, slidable within casing 1 and rigidly connected by bolt 30 to sleeve 3, the bolt 30 extending freely through slot 2. While it is preferred to construct the operating rod as a multiplicity of elements connected by universal joints to insure flexibility and to prevent binding or freezing of the rod within casing 1, it is obvious that the operating rod may be fabricated in one piece, provided the machining of the rod is carefully done and precautions are taken to insure that the rod is freely slidable within casing 1 and will not bind at any point within said casing.

Referring again to the diagonally-crossed plungers 22 and 23, such plungers are adapted to project from the end of shaft 20 and extend through apertured plate 5 and aperture 8 in housing 6. A hollow cap 31 is frictionally fitted into recess 32 in the outer face of housing 6 and is adapted to cover the free ends of plungers 22 and 23.

The channel 7 extending transversely across the inner face of housing 6, in conjunction with apertured plate 5, forms a passageway wherein are positioned gage pins 33 and 34. The outer end of each gage pin projects externally of the housing 6 at diametrically opposite points and is provided with a roller, 35 and 36 respectively, which are adapted to make contact with the inner wall of the tube to be gaged. Formed adjacent the inner end of each gage pin are diagonal grooves 37 and 38 respectively, which are adapted to receive plungers 22 and 23 extending from shaft 20 and slidably connect the gage pins 33 and 34 and the operating rod, so as to transmit any movement of the operating rod to the gage pins resulting in an extension or withdrawal of such gage pins with respect to the housing 6.

Body member 24 provided with a rack 25 is adapted to coact with a gear 39 mounted in opening 40 of collar 12. A pointer 41 associated with the gear 39 indicates upon calibrated plate 13 the internal diameter of the tube being gaged.

In operation, sleeve 3 slidably mounted on casing 1 is moved in the direction of calibrated plate 13, thereby drawing the operating rod in the same direction against the pressure exerted by compressed coil spring 26. Coincidental with this movement, plungers 22 and 23 slidably positioned in grooves 37 and 38 of gage pins 33 and 34 respectively, retract said gage pins into housing 6, thus facilitating the insertion of the end of the device into the tube, the internal diameter of which it is desired to measure.

Upon the release of sleeve 3 compressed coil spring 26 urges the operating rod in the opposite direction. As a result of the movement of the rod acting through the plungers 22 and 23 and the grooves 37 and 38 in gage pins 33 and 34, said pins are projected outwardly through the channel 7 in housing 6 until the rollers 35 and 36 make contact with the wall of the tube being measured. The movement of the operating rod in forcing the gage pins outwardly of the housing and into contact with the tube wall is transmitted to pointer 41 through the coaction of rack 25 and gear 39.

Since the longitudinal movement of the operating rod is a function of the transverse movement of gage pins 33 and 34 in channel 7 of housing 6, and since a definite relationship exists between the amplitude of movement of the operating rod and the calibrations on plate 13 mounted on collar 12, the internal diameter of the tube being gaged is readily determined and is directly readable upon calibrated plate 13.

I claim:

1. A device for measuring the internal diameter of a tube comprising an elongated cylindrical casing having a longitudinal slot formed in one wall thereof, a collar slidably mounted on the casing relative to the slot, a flexibly jointed operating rod slidably disposed within the casing, means connecting the collar with the joined operating rod, a flange rigidly affixed to one end of the casing, a housing affixed to the flange and having a recess and aperture in one side wall thereof, diagonally-crossed plungers rigidly affixed to one end of the jointed operating rod and extending through the aperture in said housing, a channel extending transversely of the housing, gage pins positioned in said channel and extendable beyond the housing walls, each pin having a slot formed adjacent the inner end slidably engaging a plunger and adapted to correlate the movement of the jointed operating rod with the gage pins, a roller affixed to the outer extremity of each gage pin and adapted to make contact with the walls of the tube to be measured, a cap associated with said housing to protect the free end of the plungers, a calibrated plate adjacent the opposite end of the casing, a pointer associated with the calibrated plate, means operatively connecting the pointer with the jointed operating rod, and spring means applying continuous pressure to the jointed operating rod to hold the gage pins in their extended position.

2. A device for measuring the internal diameter of a tube comprising a cylindrical casing having a longitudinal slot formed in one wall thereof, a collar slidably mounted relative to the slot, an operating rod slidably disposed within the casing and bolted to the collar, a flange rigidly affixed to one end of the casing, a housing bolted to the flange and having a recess and aperture in one side wall thereof, diagonally-crossed plungers rigidly affixed to one end of the operating rod and extending through the aperture of the housing, a channel extending transversely of the housing, gage pins positioned in said channel and extendable beyond the housing walls, each pin having a diagonal slot formed adjacent the inner end slidably engaging a plunger and adapted to correlate the movement of the operating rod with the gage pins, a roller affixed to the outer extremity of each gage pin and adapted to make contact with the walls of the tube to be measured, a cap frictionally fitted into the housing recess to protect the free ends of the plungers, a collar having an aperture therein rigidly affixed adjacent the opposite end of the casing, a calibrated plate affixed to the collar, a pointer associated with said plate, a rack adjacent the end of the operating rod, gear means connected to the pointer and cooperating with the rack thereby actuating the pointer when the operating rod is moved, a coil spring within the casing applying continuous pressure to the operating rod to urge the gage pins to an extended position, and a plug threaded to the casing and holding the coil spring in a state of compression.

3. A device for measuring the internal diameter of a tube comprising a cylindrical casing having a longitudinal slot formed in one wall thereof, a collar slidably mounted on the casing relative to the slot, an operating rod slidably disposed within the casing and connected to the collar, a flange rigidly affixed to one end of the casing, a housing affixed to the flange and having a recess and aperture in one side wall thereof, diagonally-crossed plungers rigidly affixed to one end of the operating rod and extending through the aperture in said housing, a channel extending transversely of the housing, gage pins positioned in said channel and extendable beyond the housing walls, each pin having a slot formed adjacent the inner end slidably engaging a plunger and adapted to correlate the movement of the operating rod with the gage pins, a roller affixed to the outer extremity of each gage pin and adapted to make contact with the walls of the tube to be measured, a calibrated plate adjacent the opposite end of the casing, a pointer associated with the calibrated plate, means operatively connecting the pointer with the operating rod, and spring means applying continuous pressure to the operating rod to hold the gage pins in their extended position.

CHARLES H. WOODCOCK.

REFERENCES CITED

The following references are of record in the file of this patent:

UNITED STATES PATENTS

| Number | Name | Date |
|---|---|---|
| 1,465,295 | Bartholdy | Aug. 21, 1923 |
| 2,121,614 | Stark | June 21, 1938 |
| 2,135,912 | Roe | Nov. 8, 1938 |
| 2,316,877 | Maag | Apr. 20, 1943 |